United States Patent
Piscopo et al.

(10) Patent No.: US 12,243,131 B2
(45) Date of Patent: Mar. 4, 2025

(54) OPERATOR INTERFACE FOR A COMBINE HARVESTER

(71) Applicant: DEERE & COMPANY, Moline, IL (US)

(72) Inventors: Salvatore Piscopo, Pirmasens (DE); Helmut Luebbers, Contwig (DE); Gregor Diessner, Homburg (DE)

(73) Assignee: Deere & Company, Moline, IL (US)

( * ) Notice: Subject to any disclaimer, the term of this patent is extended or adjusted under 35 U.S.C. 154(b) by 522 days.

(21) Appl. No.: 17/453,759

(22) Filed: Nov. 5, 2021

(65) Prior Publication Data
US 2022/0176818 A1 Jun. 9, 2022

(30) Foreign Application Priority Data
Dec. 7, 2020 (DE) .......................... 102020132516.9

(51) Int. Cl.
| | |
|---|---|
| G06T 11/60 | (2006.01) |
| A01D 41/127 | (2006.01) |
| A01F 7/06 | (2006.01) |
| A01F 12/28 | (2006.01) |
| A01F 12/44 | (2006.01) |
| B60K 35/00 | (2006.01) |
| B60K 35/28 | (2024.01) |
| B60K 35/10 | (2024.01) |
| B60K 35/22 | (2024.01) |

(52) U.S. Cl.
CPC ............ *G06T 11/60* (2013.01); *A01D 41/127* (2013.01); *A01F 7/06* (2013.01); *A01F 12/28* (2013.01); *A01F 12/444* (2013.01); *A01F 12/448* (2013.01); *B60K 35/00* (2013.01); *B60K 35/28* (2024.01); *B60K 35/10* (2024.01); *B60K 35/22* (2024.01); *B60K 2360/1438* (2024.01)

(58) Field of Classification Search
None
See application file for complete search history.

(56) References Cited

U.S. PATENT DOCUMENTS

| | | | |
|---|---|---|---|
| 6,282,476 B1 * | 8/2001 | Hieronymus | ........ A01D 41/127 340/684 |
| 2016/0161960 A1 * | 6/2016 | Yamada | ................... F24F 11/61 700/277 |

FOREIGN PATENT DOCUMENTS

| | | |
|---|---|---|
| DE | 4341834 C1 | 4/1995 |
| DE | 10147733 A1 | 4/2003 |
| EP | 1236389 A1 | 9/2002 |
| JP | 2015032306 A * | 2/2015 ............... G01D 1/12 |

* cited by examiner

*Primary Examiner* — Jwalant Amin

(57) ABSTRACT

An operator interface for a combine harvester, having a display device, input means and a processor configured to activate the display device such that the display device depicts having an elongated element, a scale being assigned thereto, and a first marking, the position thereof relative to the elongated element depending on an operating parameter of the threshing device and/or the cleaning device. A second marking and/or third marking, which represents a lower and/or upper limit of the setting range of the operating parameter which is predetermined depending on the type of crop, is assigned to the elongated element in the diagram.

14 Claims, 2 Drawing Sheets

OPERATOR INTERFACE FOR A COMBINE HARVESTER

RELATED APPLICATIONS

This application claims priority to German Patent Application No. 102020132516.9, filed 7 Dec. 2020, which is hereby incorporated by reference herein in its entirety.

FIELD OF THE DISCLOSURE

The present disclosure relates generally to combine harvester controls.

BACKGROUND OF THE DISCLOSURE

Agricultural harvesting machines, such as combine harvesters, are relatively complex machines having a plurality of operating parameters which have to be set to suitable values in order to achieve as far as possible an optimal operating result during the harvesting process. The respectively appropriate operating parameters such as threshing rotor speed or threshing drum speed, size of the threshing clearance, speed of the cleaning fan and opening size of the lower and upper sieve are generally adjustable and have to be set by the operator or an automatic system. The suitable operating parameters depend, amongst other things, on the type of crop. Thus maize or soya, which have relatively large grains, have to be harvested with operating parameters which are fundamentally different from, for example, wheat which has smaller grains, or grass seed which has very small grains.

In combine harvesters, the operating parameters currently set by the operator or the automatic system are generally displayed on the display device of an operator interface, so that the operator is able to monitor whether the set operating parameters are appropriate and whether the operator should optionally change these operating parameters, by the operator for example adjusting the currently manually set operating parameter or overriding the operating parameter predetermined by an automatic system or the automatic system making modified presettings, for example relative to the results to be achieved.

Operator interfaces with different display formats of operating parameters are known, whether in a (digital) numerical display or a tachometer-type display (DE 43 41 834 C1) or as a bar chart (DE 101 47 733 A1). These operator interfaces display only the current operating parameter without further information. A less experienced operator is not able to identify using this display whether this operating parameter is appropriate or not for the type of crop to be harvested at that time. As a result, incorrect settings of operating parameters and unsatisfactory harvesting results which result therefrom are almost already pre-programmed.

A display of the current engine speed of a forage harvester in a bar chart is disclosed in EP 1 236 389 A1. In order to avoid the situation where an operator sets a speed which is too low, which may lead to blockages in the ejection channel due to the drive connection having a fixed gear ratio between the engine and the chopping drum and the ejection fan, the speed range which may be set by the operator is limited toward the lower end, wherein the minimum settable speed may depend on the type of crop to be harvested. The non-settable setting range is specifically marked in the bar chart. In this case, the forage harvester is a different type of harvesting machine which reacts less sensitively to inappropriate operating parameters and the reason for the speed limitation and thus also the display thereof in the bar chart is to avoid blockages.

SUMMARY OF THE DISCLOSURE

According to an aspect of the present disclosure, an operator interface is provided for a combine harvester which is provided with a threshing device and a cleaning device. The operator interface may include a display device, input means and a processor which is configured to activate the display device such that this display device depicts a diagram which provides an elongated element, a scale being assigned thereto, and a first marking, the position thereof relative to the elongated element depending on an operating parameter of the threshing device and/or the cleaning device. The processor may be configured to activate the display device such that a second marking and/or third marking is assigned to the elongated element in the diagram, wherein the second marking represents a lower limit of the setting range of the operating parameter which is predetermined depending on the type of crop, and the third marking represents an upper limit of the setting range of the operating parameter which is predetermined depending on the type of crop.

The lower and/or the upper limit may be based on empirical values collected worldwide or regionally for the respective type of harvested crop and the respective type of combine harvester and may also be used by an automatic system.

The processor may be configured to obtain from the input means an input for adjusting the operating parameter and to activate the display device such that the first marking moves relative to the elongated element depending on the input. In this case, therefore, the input of the operating parameter is carried out manually.

To this end, the processor may be configured to ignore or to accept an input located below the first limit or above the second limit for adjusting the operating parameter (optionally according to the display of a corresponding instruction to exceed the limit via the display device and the receiving of an input of the operator who confirms the wish to ignore the limit).

The processor may be configured to activate the display device such that the second and/or third marking is depicted as a region of the element which is visually different from the remaining element and which contains the element between the limit and the available setting range of the operating parameter.

The processor may be configured to obtain from an automatic control unit an input for adjusting the operating parameter and to activate the display device such that the first marking moves relative to the elongated element depending on the input. In this case, therefore, the input of the operating parameter is carried out automatically. The display of the limit values makes it easier for the operator to assess whether the automatic system functions well or, if required, whether manual interventions for correcting the operating value or a different input for the automatic system, for example a target predefined value relative to a result to be achieved of the harvesting process, such as a proportion of fractured grains, cleaning, losses, throughput, etc. appear expedient.

The processor may be configured to obtain from the automatic control unit the lower and/or upper limit of the setting range of the operating parameter which is predetermined depending on the type of crop and which may also be used by the control unit when predetermining the automatically predetermined operating parameter.

The processor may be configured to activate the display device such that a fourth marking represents a history of the value of the operating parameter selected by the automatic control unit.

The processor may also be configured to obtain from a different combine harvester a value of the operating parameter used thereby and/or a historical value of the operating parameter from a stored map, and to activate the display device such that a fifth marking moves relative to the elongated element depending on said value.

The operating parameter of the threshing device may be a speed of a threshing drum or a threshing rotor or a threshing concave clearance, whilst the operating parameter of the cleaning device may be an opening size of an upper sieve or a lower sieve or the speed of a fan.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
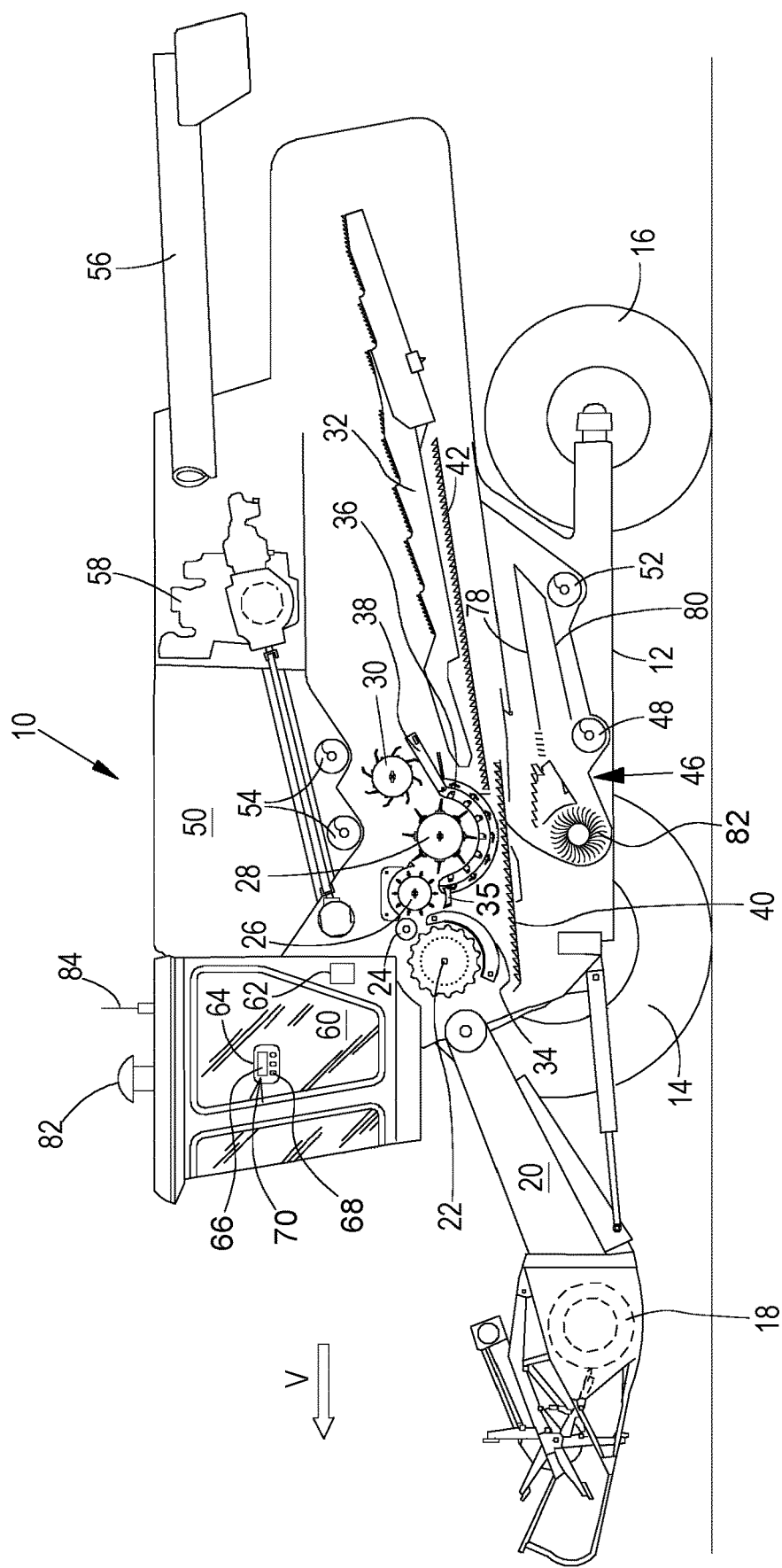
FIG. 1 shows a schematic side view of a combine harvester which has a plurality of harvested crop treatment elements and an operator interface for monitoring operating parameters of the harvested crop treatment elements.

FIG. 1 shows a self-propelled combine harvester 10 with a frame 12 which is supported on the ground via driven front wheels 14 and steerable rear wheels 16 and is moved forward thereby. The wheels 14 are set in rotation by means of drive means, not shown, in order to move the combine harvester 10, for example over a field to be harvested. Directional information, such as front and rear, refers hereinafter to the direction of travel V of the combine harvester 10 in harvesting mode, which runs to the left in FIG. 1.

A harvested crop recovery device 18 in the form of a cutter is removably attached to the front end region of the combine harvester 10 in order to harvest the harvested crops in the form of cereals or other threshable stalk crops from the field during harvesting mode and to feed the harvested crops upwardly and to the rear through a feed house 20 to a multi-drum threshing system which comprises—arranged one behind the other in the direction of travel V—a threshing drum 22, a stripping drum 24, a conveying drum 26 operating in an overshot manner, a tangential separator 28 as well as a turning drum 30. A straw vibrator 32 is located downstream of the turning drum 30. The threshing drum 22 is surrounded in its lower and rearward region by a threshing concave 34. Below the conveying drum 26 is located a cover 44 which is provided with openings or is closed, whilst a fixed cover is located above the conveying drum 26 and a separating concave 36 with adjustable finger elements is located below the tangential separator 28. A finger rake 38 is arranged below the turning drum 30.

The mixture containing grains and contaminants passing through the threshing concave 34, the separating concave 36 and the straw vibrator 32, passes via conveyor floors 40, 42 into a cleaning device 46 with a fan 82, an upper sieve 78 and a lower sieve 80. Cereals cleaned by the cleaning device 46 are fed by means of a grain auger 48 to an elevator, not shown, which conveys the cereals into a grain tank 50. A tailing auger 52 returns unthreshed parts of the grain ears by means of a further elevator, not shown, back into the threshing process. The chaff may be ejected on the rear face of the sieve device by a rotating chaff spreader or it is discharged through a straw chopper (not illustrated) arranged downstream of the straw vibrator 32. The cleaned cereal may be unloaded from the grain tank 50 by an unloading system with transverse augers 54 and an unloading conveyor 56.

The aforementioned systems are driven by means of an internal combustion engine 58 and monitored and controlled by an operator from a driver's cab 60. The different devices for threshing, conveying, cleaning and separating are located inside the frame 12. An outer casing which is largely foldable is located outside the frame 12. It remains to be mentioned that the multi-drum threshing system depicted here is only one exemplary embodiment. It could also be replaced by one or more axial threshing rotors or separator rotors or a single transversely arranged threshing drum and a separating device arranged downstream with a straw vibrator or one or more separating rotors.

The combine harvester 10 may be provided with an electronic control unit 62. The electronic control unit 62 as shown is connected to an operator interface 64 which has a display device 66, input means 66 and a processor 70 which is connected to the input means 66 and configured to activate the display device 66 in the manner described hereinafter. As shown in FIG. 1, the input means 66 may comprise buttons and/or rotary knobs to which fixed monitoring functions or those which are displayed on the display device 66 may be assigned and/or said input means may be designed as a touch-sensitive display device 66 (touchscreen). The operator interface 64 does not have to be fixedly installed in the operator's cab 60 but may be removable from a holder. The operator interface could thus be designed as a mobile computer, for example a laptop, tablet or smartphone, and also permit the combine harvester 10 to be controlled at some distance, for example from a farmhouse, if this combine harvester is designed to be self-steering, by using conventional wireless data transmission.

The electronic control unit 62 is connected in known fashion to actuators (not shown) which are actuated by external force and which, amongst other things, adjust a number of operating parameters of the threshing device and the cleaning device. In the embodiment shown, the operating parameters which are adjustable by the control unit 62 comprise the speed of the threshing drum 22 (and optionally the conveying drum 26, the tangential separator 28 and the turning drum 30), the threshing clearance, i.e. the distance between the threshing drum 22 and the threshing concave 34 (and optionally the distance between the tangential separator 28 and the separating concave 36), the speed of the fan 82, the opening size of the upper sieve 78 and the opening size of the lower sieve 80. In a further embodiment the control unit 62 may make suggestions for the operating parameters to the operator who then sets these operating parameters by hand (mechanically from the operator's cab 60 or in situ) or the operator provides inputs confirming or overriding the suggestions of the control unit 62 which are then transmitted from the control unit 62 to the actuators.

The operator interface 64 permits an operator in the driver's cab 60 to monitor and optionally to re-adjust one or more or all of said operating parameters. In this case presettings for the operating parameters are predetermined and set by the electronic control unit 62 implementing an automatic system (or any other monitoring unit which could also be implemented by the processor 70). In this case, the operator interface 64 serves for monitoring the operating parameters but allows the operator, if required, to override the operating parameters predetermined by the automatic system by means of the input means 66. The automatic system is able to monitor the operating parameters based on a type of crop to be harvested, input by the operator via the input means, and the harvested crop properties (moisture, throughput, etc.) detected by means of sensors, and the operating results of the combine harvester 10 detected by other sensors (losses, material flow and proportion of grains in the tailings, sieve loading, proportion of broken grains in the elevator, etc.). There is also the option to leave the operating parameters to be input purely manually by the operator via the input means 66.

Figure 2:
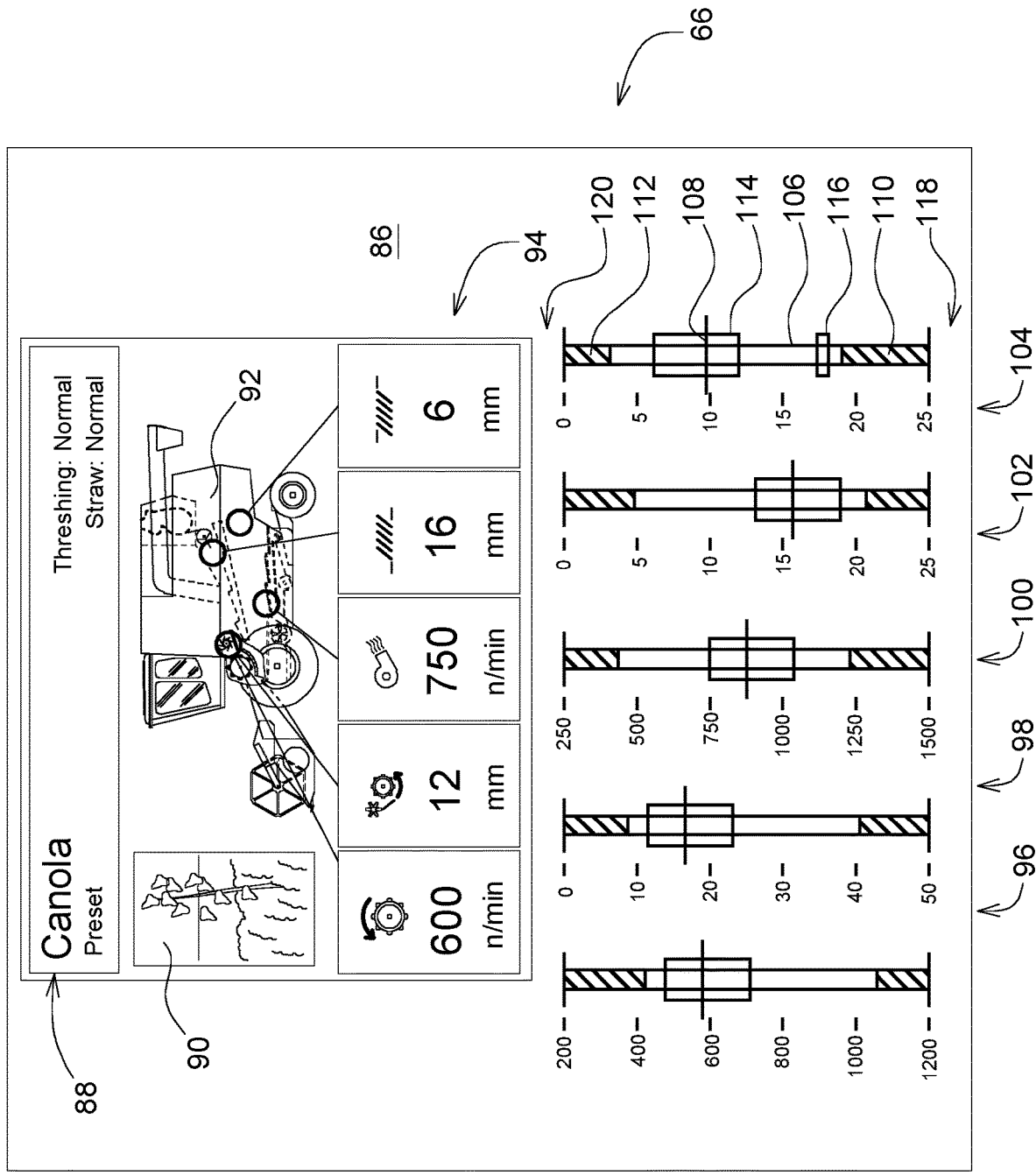
FIG. 2 shows a view of a display device of the operator interface.

The display device 66 which displays a window 86 which is selected by means of the input means 66 and which serves for displaying and optionally inputting the aforementioned operating parameters is shown in FIG. 2. The name 88 of the type of crop which is input is specified (or automatically identified by a suitable sensor system) in the upper part of the window 86 and shown therebelow in an image 90. This type of crop is required and used by the automatic system described in the preceding paragraph for predetermining the operating parameters. In a simple case, the information input about the type of crop may be used simply to read out the operating parameters from a stored table and to use these operating parameters as presettings, or the information is used in combination with the aforementioned harvested crop properties and/or operating results for a regulating procedure. Additionally, a schematic image 92 of the combine harvester 10 is shown in the window 86, symbols 94 for the modifiable operating parameters with associated adjustable members (in this case: speed of the threshing device, threshing clearance, fan speed, opening sizes of upper sieve 78 and lower sieve 80) being shown separately therebelow in a schematic view, with lines which refer to the image 92 in order to depict the position of the individual members in the combine harvester 10. This view, in particular, assists a less experienced operator in understanding how to assign the symbols 94 for the operating parameters to the associated members.

Shown in the lower part of the window 86 are a plurality of diagrams 96, 98, 100, 102, 104 which in each case are assigned to an operating parameter and which in each case are displayed below the associated symbol 94. The diagram 96 depicts the operating parameter for the speed of the threshing device. The diagram 98 depicts the operating parameter for the threshing clearance. The diagram 100 shows the speed of the fan 82. The diagram 102 shows the opening size of the upper sieve 78. The diagram 104 shows the opening size of the lower sieve 80.

The diagrams 96 to 104 show in each case a linear (bar chart-like) element 106, a scale with numerals 118, 120 being assigned thereto. A first marking 108 displays the current value of the operating parameter which is set by an input of the operator or the automatic system. The position of the first marking 108 relative to the element 106 and the scale thus depicts a display of the current operating parameter.

A second marking 110 represents a lower limit value for the operating parameter which depends on the current type of crop. In the embodiment shown in FIG. 2, the second marking 110 is depicted as a region of the element 106 which is shown in a different view (for example hatching, color, in particular red, whilst the remainder of the element 106 is displayed green, etc.) from the remaining element 106, and depicts the lower region of the existing setting range of the operating parameter which is not expediently adjustable for the respective type of crop, and the upper limit thereof.

A third marking 112 represents an upper limit value for the operating parameter which depends on the current type of crop. In the embodiment shown in FIG. 2, the third marking 112 is depicted as a region of the element 106 which is shown in a different view (hatching, color (in particular red) or the like) from the remaining element 106 and depicts the upper region of the existing setting range of the operating parameter which is not expediently adjustable for the respective type of crop, and the lower limit thereof.

The second and/or third marking 110, 112 could also be depicted as a simple triangle or other symbol which differs sufficiently from the first marking 108 and merely represents the position of the lower and/or upper limit along the element 106. The values which are dependent on the type of crop for the lower and upper limit may also be used by the described automatic system in order to fix the operating parameters automatically but only within the aforementioned limits.

A fourth marking 114 which is displayed as a bar chart depicts a (historical) value range of the operating parameter set by the automatic system over a specific time range of, for example, an hour.

A fifth marking 116 which is depicted as a line or box, or in any other manner which differs visually from the first marking, represents an operating parameter which has been received via a communication interface 84 from a different combine harvester which operates in comparable conditions. The fifth marking 116 may also represent an operating parameter which was used in the past by the combine harvester 10 and which, using the signals from a position determining device 82, is recalled from a map in which the operating parameters were stored during a harvesting process of the previous year, with the location referenced. A plurality of fifth markings 116 which originate from different combine harvesters and/or different harvesting processes may also be displayed.

It should also be mentioned that in the embodiment shown the element 106 is fixed on the display device and the first marking 108 (and the other markings 110, 112, 114, 116) move relative to the element 106. Alternatively, the first marking 108 could remain at a fixed point and the element 106 and the other markings 110, 112, 114, 116, could move. Additionally the element 106 does not have to be linear but could adopt a curved shape or the like.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An operator interface for a combine harvester having a threshing device and a cleaning device, said operator interface comprising:
   a display device,
   a processor configured to activate the display device such that the display device depicts a diagram having an elongated element, a scale being assigned thereto, and a first marking, the position thereof relative to the elongated element depending on an operating parameter of the combine harvester, wherein the processor is configured to activate the display device such that a second marking and third marking is assigned to the elongated element in the diagram, wherein the second marking represents a lower limit of the setting range of the operating parameter which is predetermined depending on the type of crop, and the third marking represents an upper limit of the setting range of the operating parameter which is predetermined depending on the type of crop, wherein the processor is configured to obtain from a different combine harvester a value of the operating parameter used thereby, and to activate the display device such that a differing marking moves relative to the elongated element depending on the said value.

2. The operator interface of claim 1, wherein the processor is configured to receive an input for adjusting the operating parameter and to activate the display device such that the first marking moves relative to the elongated element depending on the input.

3. The operator interface of claim 2, wherein the processor is configured to select between ignoring and accepting inputs located below the first limit and above the second limit for adjusting the operating parameter.

4. The operator interface as claimed in claim 1, wherein the processor is configured to activate the display device such that at least one of the second and third marking is depicted as a region of the element which is visually different from the remaining element and which contains the element between the limit and the available setting range of the operating parameter.

5. The operator interface of claim 4, wherein the processor is configured to obtain an input for adjusting the operating parameter and to activate the display device such that the first marking moves relative to the elongated element depending on the input.

6. The operator interface of claim 5, wherein the processor is configured to activate the display device such that a fourth marking represents a history of the value of the operating parameter.

7. The operator interface of claim 6, wherein the operating parameter is at least one of the following: a speed of a threshing drum, a threshing rotor and concave clearance, an opening size of an upper sieve, and the speed of a fan.

8. The operator interface of claim 4, wherein the processor is configured to obtain a limit of the setting range of the operating parameter which is predetermined depending on the type of crop and which may also be used by the control unit when predetermining the operating parameter.

9. The operator interface of claim 1, wherein the operating parameter is at least one of the following: a speed of a threshing drum, a threshing rotor and concave clearance, an opening size of an upper sieve, and the speed of a fan.

10. The operator interface of claim 1, wherein the processor is configured to select between ignoring and accepting inputs located below the first limit and above the second limit for adjusting the operating parameter.

11. The operator interface of claim 1, wherein the processor is configured to obtain an input for adjusting the operating parameter and to activate the display device such that the first marking moves relative to the elongated element depending on the input.

12. The operator interface of claim 1, wherein the processor is configured to obtain a limit of the setting range of the operating parameter which is predetermined depending on the type of crop and which may also be used by the control unit when predetermining the operating parameter.

13. An operator interface for a combine harvester having a threshing device and a cleaning device, said operator interface comprising:

a display device, a processor configured to activate the display device such that the display device depicts a diagram having an elongated element, a scale being assigned thereto, and a first marking, the position thereof relative to the elongated element depending on an operating parameter of the combine harvester, wherein the processor is configured to activate the display device such that a second marking and third marking is assigned to the elongated element in the diagram, wherein the second marking represents a lower limit of the setting range of the operating parameter which is predetermined depending on the type of crop, and the third marking represents an upper limit of the setting range of the operating parameter which is predetermined depending on the type of crop, wherein the processor is configured to obtain a historical value of the operating parameter from a stored map, and to activate the display device such that a differing marking moves relative to the elongated element depending on the said value.

14. The operator interface as claimed in claim 13, wherein the processor is configured to activate the display device such that at least one of the second and third marking is depicted as a region of the element which is visually different from the remaining element and which contains the element between the limit and the available setting range of the operating parameter.

* * * * *